United States Patent

[11] 3,558,914

[72] Inventor Hans Konrad Schmidt
Konstaz, Germany
[21] Appl. No. 785,234
[22] Filed Dec. 19, 1968
[45] Patented Jan. 26, 1971
[73] Assignee Telefunken Patentverwertungsgesellschaft m.b.H.
Ulm/Donau, Germany
[32] Priority Dec. 20, 1967
[33] Germany
[31] 1537527

[54] SIGNAL VOLTAGE CONTROL FOR LOGIC CIRCUIT
4 Claims, 2 Drawing Figs.

[52] U.S. Cl. 307/214, 307/203, 307/215, 307/230
[51] Int. Cl. H03k 3/15
[50] Field of Search 307/203, 230, 290, 273, 215; 330/69, 300

[56] References Cited
UNITED STATES PATENTS

| | | | |
|---|---|---|---|
| 3,381,142 | 4/1968 | Cook | 330/30 |
| 3,411,016 | 11/1968 | Rasiel | 307/273 |

*Primary Examiner*—Donald D. Forrer
*Assistant Examiner*—David M. Carter
*Attorney*—Spencer & Kaye

ABSTRACT: In an emitter-coupled logic circuit of the type having two transistors with their emitters connected to each other and to a common voltage source via a current supply circuit and their collectors connected via collector resistors to the other pole of the voltage source and in which a voltage of either a first or of a second value is supplied to the base of the first transistor, and in which a voltage of a value intermediate between the first and second voltages is supplied to the base of the second transistor, the improvement comprising a pair of resistors connecting the collectors of the first and the second transistors, and means electrically connecting the base of the second transistor with a point between the two resistors.

PATENTED JAN 26 1971 3,558,914

Inventor:
Hans Konrad Schmidt
By: Spencer & Kaye
Attorneys

SIGNAL VOLTAGE CONTROL FOR LOGIC CIRCUIT

CROSS-REFERENCE TO RELATED APPLICATIONS

This application constitutes an improvement upon the type of logic circuit disclosed in the copending applications Ser. No. 650,300, filed Jun. 30th 1967, now U.S. Pat. No. 3,504,192 and Ser. No. 747,734, filed Jul. 17, 1968, both of common ownership with this application.

BACKGROUND OF THE INVENTION

This invention relates to logic circuits and more particularly to an arrangement for controlling the input voltages of a particular type of logic circuit.

A type of logic circuit known, among other names, by the name of emitter-coupled logic circuit is described in the above copending applications and in "Nerem Record," 1965, pages 174 and 175.

Among the advantages of such emitter-coupled logic circuits is that only one input connection is needed for each circuit. On this single input connection a signal corresponding to either logic 1 or logic 0 can be provided. A control voltage is supplied to the other transistor of the circuit, which therefore does not need to receive a logic input signal. Use of such logic circuits substantially reduces the connections needed between the circuits. Not only does this simplify the design problem, but, more important, it permits a very substantial space saving in a computer using many such circuits.

In this type of circuit, the two transistors are connected in a current-receiving arrangement with their emitters connected via a current supply circuit to one pole of a voltage supply source and with their collectors connected via collector resistors to the other pole of the voltage supply source. Control signals having either a first or a second voltage value are applied to the base of a first transistor and a voltage which is intermediate in value between the first and second value is applied to the base of the second transistors.

By controlling the first transistor with a 2-value signal and the second transistor with a fixed comparison voltage between the two voltage values both transistors always exhibit opposite conductivity states with respect to each other.

Particular attention must be directed in circuits of this type to the comparison voltage. This voltage must be independent of temperature influences, fluctuations in the supply voltage, etc., and must always remain between the two mentioned voltages. To achieve this, the known circuits for the comparison voltages are provided with a special control circuit.

SUMMARY OF THE INVENTION

Among the objects of the present invention is the provision of a circuit for maintaining the control voltage to one of the transistors at a value between the two voltages applied as control signals to the other transistor.

A further object is the provision of such a circuit in which no special control circuit is needed to maintain such a control voltage at a level between the two voltages supplied to the other transistor despite fluctuations caused by temperature and other variations.

Briefly stated, these and other objects are accomplished by providing a series circuit including two equal-size resistors disposed between the collector of the first transistor and the collector of the second transistor, and connecting a point between the two resistors to the base of the second transistor.

DESCRIPTION OF THE PREFERRED EMBODIMENTS

Figure 1:
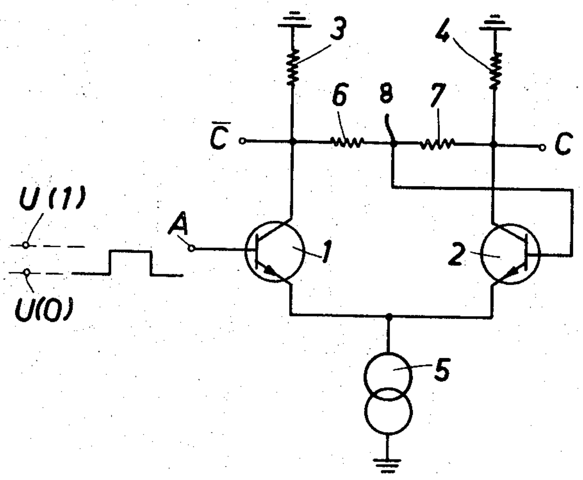
FIG. 1 is a circuit diagram of one embodiment of the invention.

Referring now to the drawings, FIG. 1 is a circuit which includes two transistors 1 and 2 whose collector resistors 3 and 4 are connected to ground. Output terminals C and $\bar{C}$ are connected to the collectors of transistors 2 and 1, respectively. The emitters of both transistors are connected to each other and also to a constant current source 5 which in turn is connected to ground. Between the collectors of both transistors, there is disposed a series connection of two resistors 6 and 7 each of which is of equal value. A point 8 between the resistors is connected to the base of transistor 2. The entire circuit is controlled through a terminal A which is connected to the base of transistor 1. An input signal of either a lower voltage $U_{(0)}$ or a higher voltage $U_{(1)}$ may be applied to terminal A. For purposes of illustration, these signals might correspond to logic values zero and one, respectively, or vice versa.

The value of voltage $U_{(0)}$ is such that transistor 1 is in the nonconductive state in response to this voltage. The circuit will have been so designed that at this time transistor 2 is conductive.

Accordingly, a current passes through transistor 2 and mainly through resistor 4. This means a low voltage at C (logical zero). The line connecting point 8 to the base of transistor 2 applies a control signal to the base of the transistor whose value is half of the voltage across resistors 6 and 7, which serve as voltage divider between C and $\bar{C}$.

At the same time, transistor 1 is in the nonconductive state and as the values of the resistors 6 and 7 are substantially greater than the values of resistors 3 and 4 the output voltage at $\bar{C}$ is high which means logical value 1.

When a higher voltage signal $U_{(1)}$ appears at terminal A, transistor 1 becomes conductive and transistor 2 becomes nonconductive. The voltage on the base of transistor 2 must be maintained at a level between the $U_{(0)}$ and the $U_{(1)}$ levels for this conductivity shift to occur. When the same voltages U(1) were applied to the bases of the two transistors 1 and 2, the collector-emitter-currents would have the same value. In FIG. 1, however, a basis-voltage is applied to transistor 1, which is higher or lower than the basis-voltage of transistor 2 by the value of $\frac{U(1)-U(0)}{2}$. Supposed that this value is high enough (for Si-transistors approximately 0,4 V), the current through the one transistor is neglectable or zero in comparison with the current through the other transistor because of the voltage-current-characteristic of the basis-emitter-diode of the transistors. Therefore, the one transistor is conductive, when the other is nonconductive and vice versa.

Transistor 1 now delivers a voltage to terminal $\bar{C}$ corresponding to that which transistor 2 had formerly delivered to terminal C (logical value one). The $\bar{C}$ output now jumps to the lower value which corresponds to logic value zero. The voltage at point 8 remains at its same value as before and, accordingly, the signal on the base of the transistor 2 remains constant.

When a new signal $U_{(0)}$ appears at terminal A, the circuit switches back to its previous condition.

Figure 2:
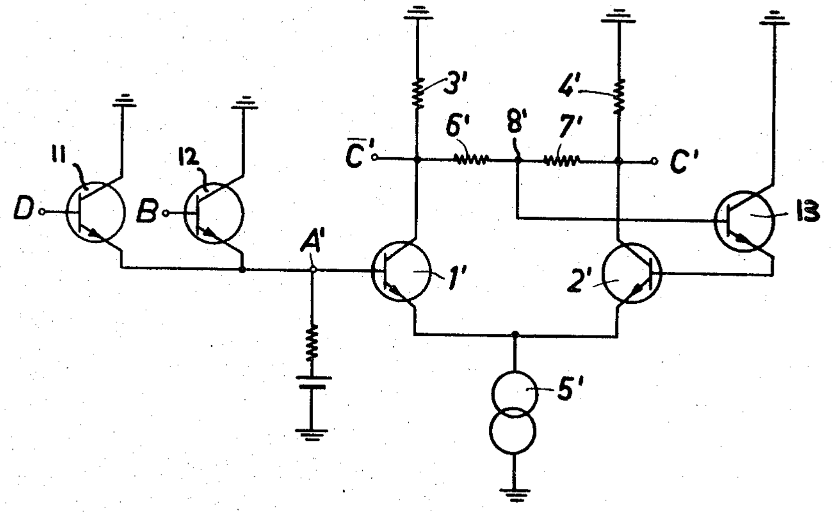
FIG. 2 is a circuit diagram of another embodiment of the invention.

The embodiment of FIG. 2 is generally similar to that of FIG. 1 and corresponding parts have corresponding reference numerals.

Additional transistors 11, 12 and 13 are provided. Transistors 11 and 12 each have their emitter connected to the input terminal A′ and their collector connected to ground. The bases of these transistors are connected to other logic circuits made according to the present invention and receive inputs D and B. Transistor 13 has its base connected to terminal 8′ and its emitter connected to the base of transistor 2. The collector of transistor 13 is connected to ground. Resistors 6′ and 7′ have equal resistance values which are substantially greater than the values of resistors 3′ and 4′. Outputs $\bar{C}'$ and C′ are connected to inputs corresponding to D and B of still other logic circuits made according to the present invention.

In operation, transistors 11 and 12 deliver outputs $U_{(0)}$ or $U_{(1)}$ to terminal A which then assumes a voltage corresponding to that of the higher voltage signal. The signals of $U_{(0)}$ and $U_{(1)}$ are not, however, equal in voltage to the outputs at the preceding circuit's or circuits' terminals C′ and $\bar{C}'$. This is because there is a voltage drop UBE from the base to the emitter of transistors 11 or 12. This voltage drop is not essential because of the constant current source 5'. This, however, introduces a complicating factor insofar as the signal applied to the base of transistor 2 is concerned. Since the output at one of the terminals C or $\overline{C}$ will be $U_{(0)} + U_{BE}$ and the output at the other terminal will be $U_{(1)} + U_{BE}'$ the voltage at the midpoint 8' is also raised by $U_{BE}$. The additional transistor 13 compensates the voltage drop $U_{BE}$ of transistor 11 and 12. As a result, the voltage at point 8' is reduced by the voltage loss $U_{BE}$ in passing through the transistor 13 and the voltage applied to the base of transistor 2' is thus at the midpoint between the signal $U_{(0)}$ and $U_{(1)}$ as applied at terminal A'.

By introducing transistor 13 into the circuit, the resistors 6' and 7' can be selected to be relatively highly resistant. This measure results in a good decoupling of outputs C and $\overline{C}$.

If the signal rise $U_{(1)} - U_{(0)}$ is selected to be equal to $U_{BE}'$ the collector of transistor 1' can never be more negative than its base. The above-mentioned transistor will thus not become saturated which makes possible very rapid switching of the entire circuit.

It will be readily apparent that there has been provided an emitter-coupled logic circuit in which the control voltage applied to the second transistor can be maintained at a voltage between that of the two control signals supplied to the other transistors and in which no special control circuit need be provided to ensure that the voltage remains at this level notwithstanding temperature changes or fluctuations in the supply voltage, etc.

It will be understood that the above description of the present invention is susceptible to various modifications, changes and adaptations.

I claim:

1. In a logic circuit having two transistors with their emitters connected to each other and to a common voltage source via a current supply circuit and their collectors connected via collector resistors to the other pole of the voltage source and means for supplying a voltage of either a first or of a second value to the base of the first transistor and a voltage intermediate in value between the said two voltages to the base of the second transistor, the improvement comprising a pair of resistors connecting the collectors of the first and the second transistor and means connecting a point between the two said resistors with the base of the second transistor.

2. The logic circuit according to claim 1 in which the resistors connecting the collectors are of equal value.

3. A logic circuit according to claim 1 in which the means connecting said second transistor and the point between the said resistors includes means connecting the base of the second transistor to the emitter of a third transistor and means connecting the base of the third transistor with the point between the two said resistors, and also including means connecting the collector of the third transistor to the other pole of the voltage source.

4. A logic circuit according to claim 1 in which the value of the resistors connecting the collectors of the first and second transistors is substantially greater than the value of the collector resistors.